United States Patent [19]

Williams et al.

[11] Patent Number: 6,097,801
[45] Date of Patent: Aug. 1, 2000

[54] NUMBER PORTABILITY USING ENHANCED ROUTING TABLE

[75] Inventors: L. Lloyd Williams; R. William Carkner, both of Kanata; John Milton Anderson, Orleans; Michael Andrew Gaskin, Kanata; William Edward Taylor, Nepean, all of Canada

[73] Assignee: Stentor Resource Centre, Inc., Ottawa, Canada

[21] Appl. No.: 08/746,272

[22] Filed: Nov. 7, 1996

Related U.S. Application Data

[63] Continuation-in-part of application No. 08/612,660, Mar. 8, 1996.

[51] Int. Cl.[7] .............................. H04M 3/42; H04M 7/00; H04J 3/12
[52] U.S. Cl. ........................ 379/207; 370/385; 379/211; 379/220; 379/230
[58] Field of Search .................................... 379/201, 207, 379/210, 211, 212, 219, 220, 221, 222, 224, 225, 229, 230; 370/385

[56] References Cited

U.S. PATENT DOCUMENTS

| | | | |
|---|---|---|---|
| 4,754,479 | 6/1988 | Bicknell et al. | 379/207 |
| 5,237,604 | 8/1993 | Ryan | 379/230 X |
| 5,602,909 | 2/1997 | Carkner et al. | 379/230 X |
| 5,625,681 | 4/1997 | Butler, II | 379/230 X |
| 5,661,792 | 8/1997 | Akinpelu et al. | 379/207 X |
| 5,717,748 | 2/1998 | Sneed, Jr. et al. | 379/207 |
| 5,867,570 | 2/1999 | Bargout et al. | 379/230 X |

OTHER PUBLICATIONS

Nortel, Document No. T1S1.3/95–11103, "Look–Ahead Option for Local Number Portability", 4 pages, dated Nov. 8, 1995.

*Primary Examiner*—Harry S. Hong
*Attorney, Agent, or Firm*—Corbin & Gittes

[57] ABSTRACT

A method of providing number portability for the treatment of calls from a calling party to a specific number of a ported called party is disclosed. Once the dialed digits are received at a switching office serving the calling party, a determination is made of whether the call is a number that has been ported. If the number has been ported, the new routing information is obtained from an enhanced directory number table resident at the originating office. In the event that the originating office is unable to offer LRN service, information is obtained at an alternate office. Routing information is updated automatically and directly from a network Service Management System (SMS) to each telephone exchange.

24 Claims, 12 Drawing Sheets

ENHANCED DATA TABLE

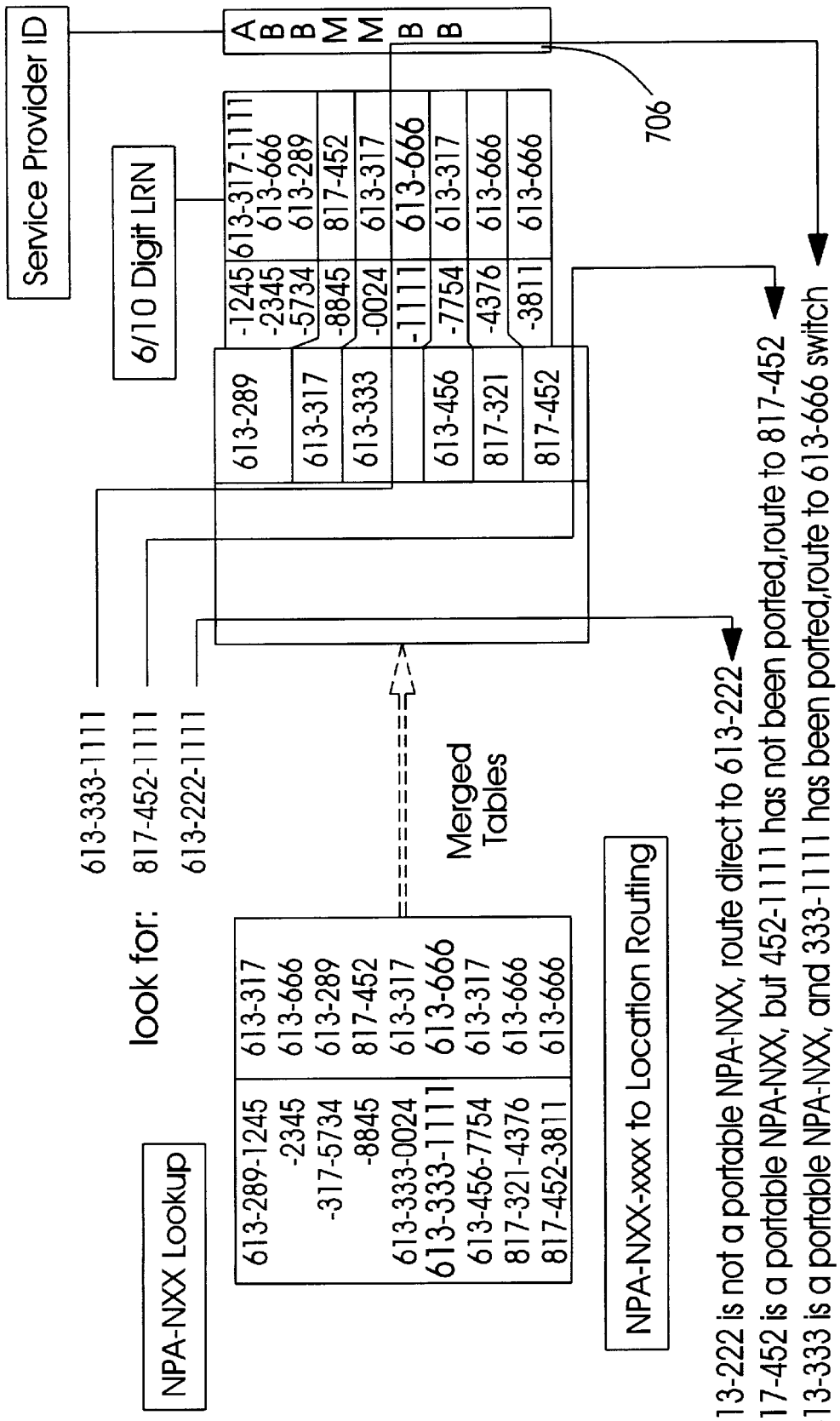

NUMBER PORTABILITY USING ENHANCED ROUTING TABLE

This is a continuation-in-part patent application of U.S. application Ser. No. 08/612,660, filed Mar. 8, 1996.

SUMMARY OF THE INVENTION

This invention relates to telephone networks, but more particularly, to a method and system for providing number portability using IN and switch based database queries.

BACKGROUND OF THE INVENTION

Although efforts are being made to solve some of today's network transparency constraints, the solutions offered are still constrained by the rigid rules of today's North American Numbering Plan (NANP) and the architecture which supports it. That is, each telephone subscriber has a number in the NXX-NXX-XXXX format, where N represents a digit from 2–9 and X represents a digit from 0–9. The first group of three digits indicates the area code or NPA of the subscriber, the second group of three digits indicates a switching exchange or service switching point to which the subscriber is connected, and the last four digits indicates the address of the subscriber within the service switching point. Digits 0 and 1 are of course not available as the first digit (N) to allow operator and long distance services.

With the large increase in telephone devices of one sort or another, an equivalent increase in the demand of telephone numbers has been created. For example, 15 years ago, most telephone numbers were used for fixed Plain Ordinary Telephone Service (POTS) devices. Today, more and more users make use of several devices, such as cellular telephones, pagers, fax machines, modems, etc. This demand has placed a large impact on the pool of numbers available for customers. In some instances, a metropolitan area which used to be served by one area code, now requires several. The problem is of course compounded by the need to assign new telephone numbers to subscribers which move from one region to another. In addition, in the future, numbers must be portable between competing network carriers, namely between the Incumbent Local Exchange Carriers (ILEC) and Competitive Local Exchange Carriers (CLEC), as well as within the Incubent's own network.

The same applies to competition between toll carriers, which is especially fierce to capture business customers who have locations which are connected via toll lines.

Generally, the customer is interested in forming a seamless communication network in terms of feature operation, and dialing patterns. It also would like its network to be transparent to calling clients and customers, with calls easily covered, routed and transferred throughout their network as though they were at a single location. Number portability therefore becomes important to them, not only within their private network, but externally as well.

The customer's ability to select an inter-LATA or toll carrier is made possible by a Regulation called equal access (EA). Equal access is an operating company tariff which provides a given subscriber access that is equal in type and quality to every inter-LATA carrier. Each IEC has a dialing arrangement, call-screening technique, routing procedure, billing record, and signalling protocol are required to implement the EA environment.

The EA concept originated in the United States with the modified final judgment (MFJ) of 1982 in which AT&T lost its long-distance monopoly and was also required to divest itself of the Bell operating companies (BOCs). This divestiture action resulted in the formation of seven regional holding companies, each comprised of a number of the original BOCs. Manufacturers have implemented the EA concept according to the regulatory requirements of the 1982 MFJ. The United States EA concept is built on geo-politically defined local access and transport areas (LATAs). A LATA is a fixed non-overlapping geographic area determined at the time of the MFJ ruling. Telecommunication services within a LATA, including local and toll calls within a LATA, are carried by Bell operating companies. Inter-LATA traffic must be carried by an inter-LATA carrier (IC). Today, intra-LATA competition is now allowed in the United States. That is, subscribers have the capability of selecting an alternate intra-LATA carrier for intra-LATA calls as well as an inter-LATA carrier for inter-LATA calls. The BOC must transfer inter-LATA traffic to the IC directly from the end office (EO) or via an intermediate switch called an access tandem (AT). The physical location of an IC within a LATA is referred to as the point of presence (POP).

As indicated above, regulators have requested that once implemented, number portability should be available across competing networks. Unfortunately, network facilitators have been unsuccessfully researching options for delivering a service in which telephone numbers are not tied to equipment locations.

New telephone networks with Advanced Intelligent Network (AIN) concepts have been proposed to support faster development of new services through a network architecture in which network functions and interfaces are standardized providing greater independence between service software and technology.

One service application which makes use of AIN technology for separating dialing from physical routing is Local Number Portability (LNP). Various applications are being examined by the Information Industry Liaison Committee (IILC) for extension of LNP concepts. Many options have been discussed and are being investigated. The options to route based on network number ownership fall short, in the sense that they impose various limitations, and some are at this time unworkable, while others must be trialed.

With the introduction of Local Number Portability (LNP) in the North American telephone network, customers will be able to take their current telephone numbers with them when they move within an area defined by the federal or state regulator, such as a city or a county. The Location Routing Number method (LRN) and Query on Release (QoR) LNP method, as identified by the Illinois Commerce Commission and Bellcore, are currently accepted by the North American telephone industry as the preferred methods to determine which switch the customer is now served from. These methods are based on a serving switch making an AIN Transaction Capabilities Application Part (TCAP) query to a remote database which is common to a large number of switches. The database returns the information that is required to complete the call to the switch which now serves the customer. This method requires an extensive signalling network to launch an information query and send back the required data.

An attempt to provide number portability for a private network is offered in U.S. Pat. No. 4,754,479, which issued to Bicknell et al. In this patent, an arrangement is disclosed for providing station number portability to stations ported from an original switching node to a new switching node which allows the ported station to maintain its original assigned station number. Bicknell et al. is able to achieve this feature by providing a data base, common to each and every switching node located within a portability cluster. Thus, when a calling party attempts to reach a called party, which is now served by a new switching node, the switching node serving the calling party will be able to identify, from the common database, that the called party is now being served by a new switching node and accordingly route the call to that new switching node.

Although Bicknell et al. offer that their service could be expanded to provide a network wide service, they confess that an extensive common database, listing station number and switch associations would be required and that such a large database could only be implemented if space and economic constraints were removed.

Some people have proposed that networks should evolve by removing portions of the intelligence from the telephone exchange and instead use database query procedures to increase network flexibility. Where initial decisions can be made for launching a query to a database, increased flexibility can be easily obtained, usually with reduced costs. However, the costs increase dramatically when all calls from a specific exchange require this procedure. For example, costs associated with the database query implementation include:

AIN and/or vendor license charges (usually on a per dip basis);

Increase in exchange CPU requirements (factor of 2–5 per call);

Augment of the signalling network;

Database infrastructure required to support queries; and

Database updates to keep all systems current.

Number portability requires the treatment of all calls to a specific number irrespective of the point of origin, making the terminating switch the most logical location to control the call. Initially, this concept seemed to present an inexpensive option for allowing portability, but it was soon realized that as the numbers increase, many additional circuits would be required. At this point, release link trunks can be employed to reduce the connections, but this requires a common protocol and significant interconnection development.

Most solutions carry significant development requirements and it is therefore important to choose the option which can support the requirements over the long term.

Several options are recognized and popular at present. The use AIN technology to use a query and response procedure for each call to query a database to establish number ownership is the most popular. Another option is that of Terminating Switch Routing. This proposal consists of the routing of calls using the existing NANP to the expected terminating switch location where, when numbers are owned by another network, calls are then route advanced to that network. In some cases, release link trunks are envisioned to reduce the number of circuits required.

Some problems still exist in implementing these proposed methods, including flash cuts, calls being routed several times between networks and inefficient routing schemes. In addition, the solutions proposed above, are meant to make use of AIN technology. Although AIN is considered a subset of Intelligent Networks (IN), number portability should not be limited to AIN networks only.

A need therefore exists for providing a mechanism to enable the gradual deployment of LNP while providing the flexibility to eliminate the high costs and time delays associated with queries of a remote database.

SUMMARY OF THE INVENTION

It is therefore an object of the present invention to provide number portability which overcomes the aforementioned problems.

Another object of the present invention is to provide a method of routing calls between networks with ported numbers while making use of existing facilities, minimizing call routing complexities and costs.

Yet another object of the present invention is to provide number portability such that calls to ported numbers are identified by using the public network's switch hierarchy.

Yet another object of the present invention is to provide number portability wherein ported calls within a local area are identified locally, whereas calls to ported numbers which are routed external of the calling area are identified externally thereof.

Yet another object of the present invention is to provide number portability such that the terminating location for calls to ported numbers are identified at the originating switch.

Yet another object of the present invention is to provide number portability such that the terminating location for calls to ported numbers are identified at an alternate or terminating switch when the originating switch is unable to identify ported numbers.

Yet another object of the present invention is to provide number portability wherein the location of ported numbers are identified from a LNP table collocated at the switch.

Yet another object of the present invention is to provide number portability such that the identification of ported numbers and routing option is provided at the same LNP table.

Yet another object of the present invention is to provide number portability wherein the LNP table collocated at the switch is dynamically updated from a central LNP depository updated from an operational Services Management System (SMS) as changes occur within the network.

Accordingly, a first aspect of the invention is to provide in a telephone network having a number of telephone switching offices equipped with SSPs (Service Switching Points), a method of providing number portability for the treatment of calls from a calling party to a ported number of a called party, comprising the steps of:

a) receiving digits dialed by said calling party at a switching office serving said calling party;

b) determining from a first directory number database at a first exchange, whether the dialed digits are associated with a ported number;

c) querying a second directory number database collocated with said first directory number database, to obtain a routing option, if the dialed digits are determined at step b) to be associated with a ported number;

d) establishing a signalling path from said first exchange to a terminating exchange associated with the ported number by creating an Initial Address Message (IAM) according to said routing option; and e) receiving said Initial Address Message (IAM) at said terminating exchange to enable the call to reach the called party.

A second aspect of the invention is to provide in a telephone network having a number of telephone switching offices equipped with SSPs (Service Switching Points), a system for providing number portability for the treatment of calls from a calling party to a portable number of a called party, comprising:

a) a first switching office for receiving digits dialed by said calling;

b) an alternate switching office connected to said first switching office via a signalling path established for routing a call associated with the dialed digits;

c) first directory number database means, for determining whether said dialed digits are associated with a portable number;

d) second directory number database means collocated with said first directory number database means, for providing a routing option, if said dialed digits are determined to be associated with a portable number and for translating said dialed digits to provide a new routing option, such that when an Initial Address Message (IAM) containing a new routing option is received at said terminating office said terminating office can enable said call to reach said called party.

BRIEF DESCRIPTION OF THE DRAWINGS

In order to impart full understanding of the manner in which this object and others are attained in accordance with the present invention, preferred embodiments thereof will be described hereinafter with reference to the accompanying drawings wherein:

FIGS. 7a and 7b are block diagrams illustrating the use of the enhanced portability table according to the embodiment of FIG. 2b, 4a and 4b;

In the following description and the drawings, the same reference numerals will refer to the same structural elements.

DESCRIPTION OF THE PREFERRED EMBODIMENTS

Figure 1:
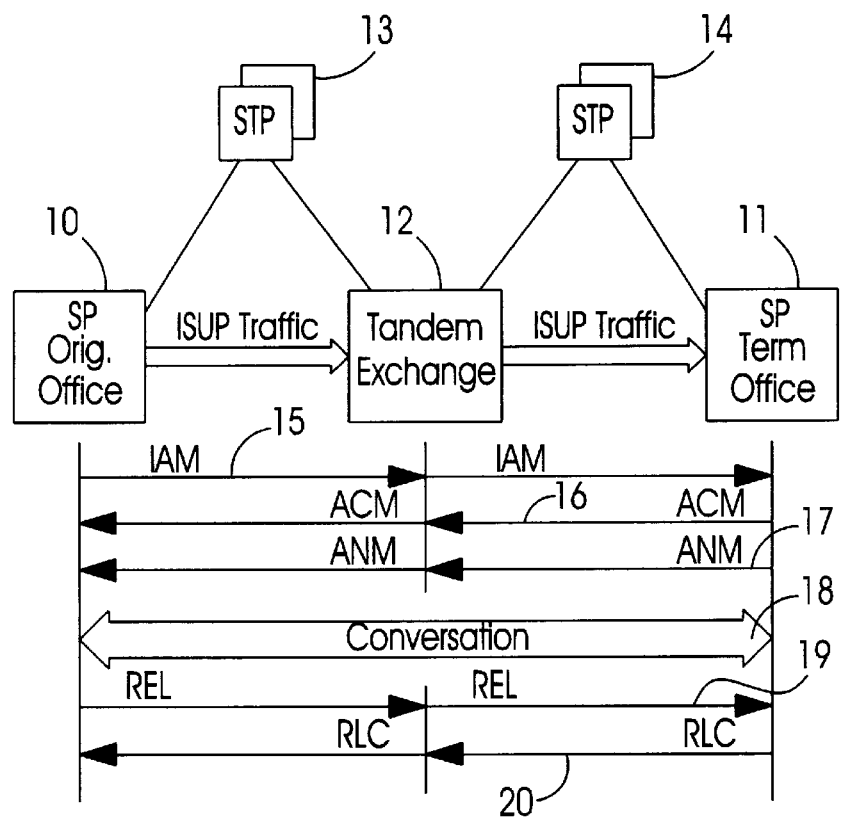
FIG. 1 is a diagram illustrating generally the basic signalling call flow between an originating and a terminating office.

In order to lighten the following description, the following acronyms will be used:

ACM: Address Complete Message;
AIN: Advanced Intelligent Network;
ANM: Answer Message;
CCS7: SS7 network signalling;
CLEC: Competing Local Exchange Carrier;
DN: Directory Number;
LAN: Local Area Network
LATA: Local Access Transport Area;
LRN: Location Routing Number;
IAM: Initial Address Message;
IEC: Inter Exchange Carrier;
ILEC: Incumbent Local Exchange Carrier
IN: Intelligent Network;
IOC: Input Output Controller;
ISDN: Integrated Services Digital Network;
ISUP: ISDN User Part;
NPAC: Number Portability Administration Center;
POTS: Plain Ordinary Telephone System
PSTN: Public Switching Telephone Network;
REL: Release Message;
RLC Release Complete;
SCP: Signalling Control Point;
SMS: Services Management System;
SSP: Service Switching Point;
STP: Signalling Transfer Point;
SUS: Suspend Message;
TCAP: Transaction Capabilities Application Part;
WAN: Wide Area Network.

As indicated above, AIN is considered a subset of IN. However, for the purpose of the present invention, IN will be used hereinafter, even though the solutions offered here are applicable to AIN as well.

A typical SS7 network consists of signalling links and nodes. SS7 nodes are referred to as signalling points (SP) and are interconnected by signalling links. Each SS7 signalling node is assigned a unique point code, serving as the network address for message routing. SS7 signalling nodes include signalling Points (SP), service switching points (SSP), service control points (SCP) and signal transfer points (STP).

Signalling points (SP) are capable of sending and receiving SS7 messages with other SS7-equipped telephone offices, and routing calls based on the information exchanged. Incoming messages are formatted and transferred to the relevant processing function in the switch. Outgoing messages are transmitted over the signalling links.

Service switching points (SSPs) are Signalling Points (SP) further equipped to halt call progress, launch an SS7 query to obtain additional routing information from an SCP, and then route or treat the call based on the information received in the SCP's response. SSPs interact with databases to provide services and routing.

Service control points (SCP) are often referred to as SS7 services databases. One or more SCPs can serve as a central intelligence point in the network for enhancing how and if calls are to be routed through the network. Queries and responses to and from the SCP are carried over SS7 signalling links in the form of packet messages.

Signal transfer points (STP), are special SS7 nodes which provide a message switching function between other nodes and a SS7 network. Acting as a packet switch, it examines incoming messages and then routes them over the appropriate signalling link to the proper destination switching offices and databases. In this particular function, it supports end-to-end signalling, i.e. in transit (local, tandem and toll) connections, required for transaction messaging used for special services. Unlike other SS7 nodes, the STP does not generally act as a source or sink for SS7 messages.

Referring now to FIG. 1, we have shown a flow diagram which is used for providing an understanding of ISUP (Integrated Services Digital Network (ISDN) User Part) call progression. Signalling Transfer Points (STPs) have been shown but are usually transparent to ISUP signalling.

The message purposes are defined as follows: Initial Address Message 15 (IAM): Indicates a request to each subsequent exchange for call set-up and to reserve the indicated trunk. Call connection will not be completed until the status is returned indicating the call path has been confirmed and the dialed number exists and is idle. The IAM contains information about both the calling and called parties.

Address Complete Message 16 (ACM): Indicates to the originating exchange that the call path has been confirmed and the dialed address exists and is idle.

Answer Message 17 (ANM): Returned by the terminating exchange once the call has been answered. Both directions of the call path 18 are established at this time.

Release Message 19 (REL): Sent by the originating office to indicate that the originating party has terminated the call.

Release Complete 20 (RLC): Indication from the terminating exchange that the release message has been received and all connections have been terminated. The RLC can be considered as an acknowledgment of a REL message and the circuit being taken down.

In the call scenario of FIG. 1, the signalling call flow is illustrated for call set-up and take-down of a call between originating office 10 and terminating office 11, via tandem exchange or intermediate office 12. After the calling party has picked up the receiver, received a dial tone and entered digits, dialed digits are received at the originating switch 10. The first message sent during ISUP signalling call set up is an Initial Address Message 15 (IAM), which is created and sent from an originating office 10 to a tandem exchange 12 and re-created at tandem exchange 12 and forwarded to terminating office 11. The STP pairs 13 and 14, as indicated above, have been shown but are usually transparent to ISUP signalling. The IAM message 15 passes information about the call to all subsequent offices in the path. The IAM reserves a voice path while verifying the availability of the destination station, at the far end, i.e. terminating office 11. An Address Complete Message (ACM) 16 then sends confirmation that the dialed address both exists and is idle. Where the far end is available, a call path is established. Once the called party answers, an answer message (ANM) 17 is then returned to the originating office 10 and the conversation 18 then begins.

Call termination can be initiated from either the originating office 10 or the terminating office 11. Most ISUP protocols make use of release messages in either direction, for example, REL message 19 of FIG. 1. A release complete message (RLC) 20 is then returned, in this case, from the terminating office 11 to the originating office 10, indicating that all circuits have been returned to the available resource pool.

As indicated above, one embodiment of the present invention makes use of the switch hierarchy which exists in most public networks in order to provide local number portability. That is, as a call progresses through its path to the called party, the identification of whether the dialed number is ported, is done as the call is routed from the originating switch to the new terminating switch where the called station is now ported. The term 'ported' is used to indicate that a connection or 'port' for the called station exist at that switch. Thus, before number portability was established, the location of a called station or where it was ported was based on it's NPA-NXX-XXXX numbering plan. A called station could be located in a network based on this numbering plan. However, with number portability, the identification of the switch on which a called station is ported can no longer be established by simply routing the call based on the station's directory number.

In the present embodiment of the invention, the identification of whether the dialed number is ported, is done as the call is routed from the originating switch to the new terminating switch where the called station is now ported. This is done regardless of whether the called party is served locally, externally of the calling area, by the ILEC or a CLEC.

Figure 4A:
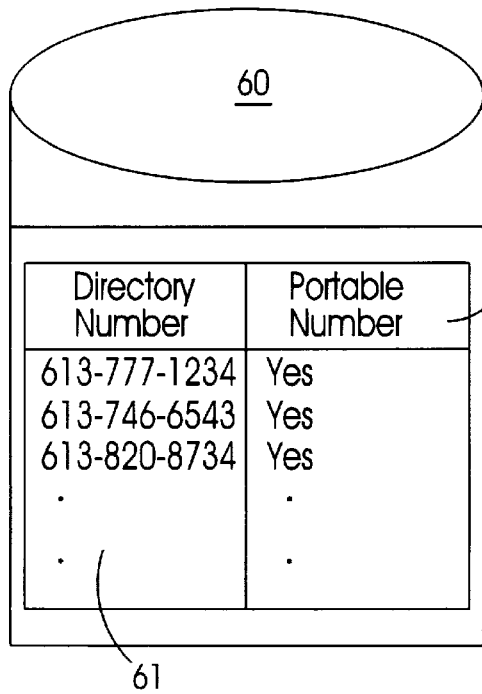
FIGS. 4a and 4b are diagrams illustrating database tables for use with the present invention.

In order to route a call, a table is required on each telephone exchange in the network to permit a binary search to be performed to determine whether the North American Numbering Plan (NANP) can be used to route the call. Such a table is shown in FIG. 4a and will be described further below.

With this embodiment, when the destination numbers are owned by the ILEC, the call is routed using standard NANP translations. On the other hand, the determination of whether the destination number is flagged as unique, i.e. is a portable number, is made from an enhanced table located at a switching node along the call path. Once the destination number is flagged as unique at the enhanced table, a routing option is provided to enable to call to reach its final destination. In one embodiment, the routing option is provided, in response to a query to an external database. This is illustrated with reference to FIGS. 2a and 3a.

Figure 2A:
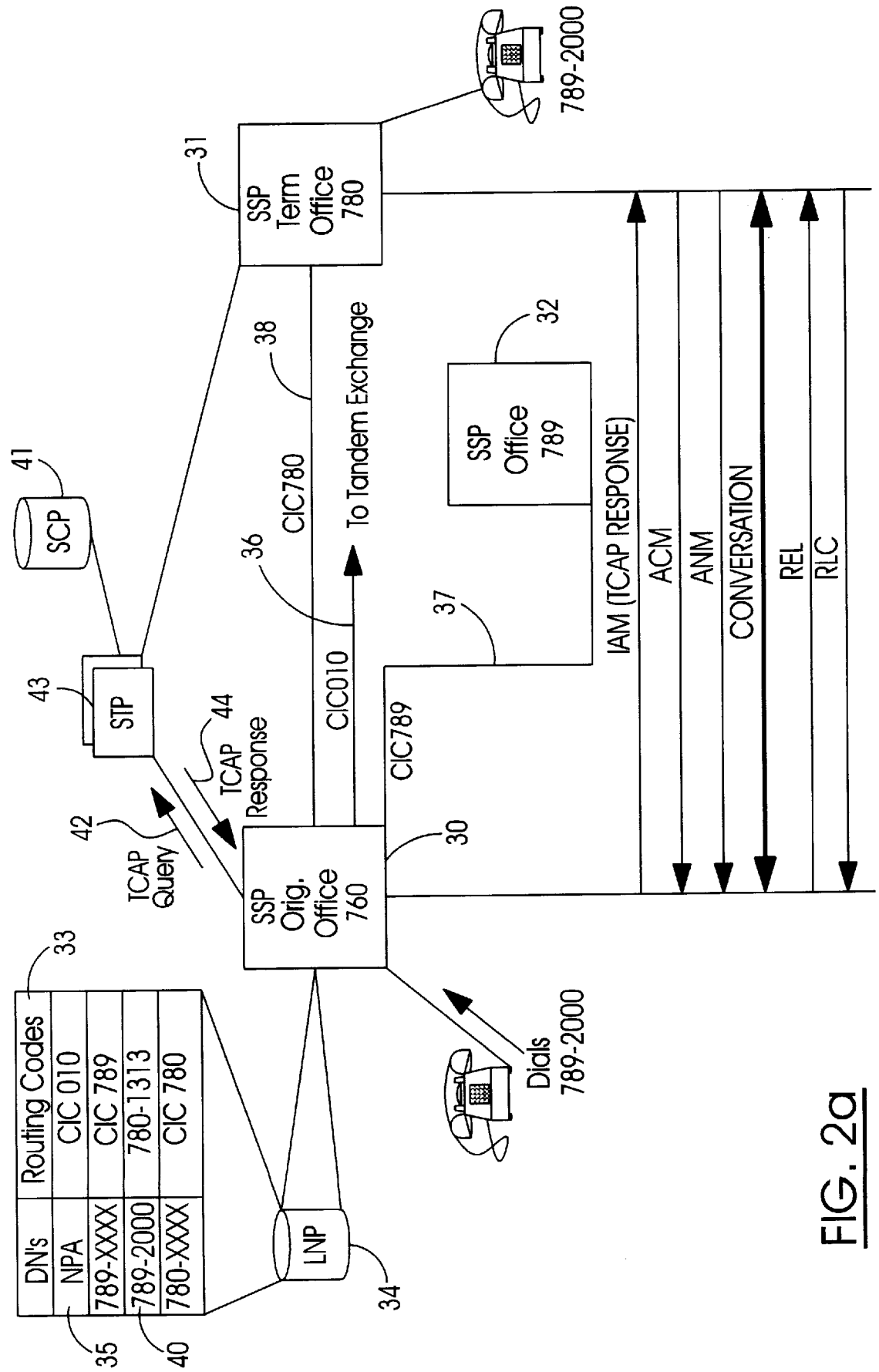
FIGS. 2a and 2b are diagrams illustrating signalling call flow scenarios according to a first and second embodiment of the present invention.

The call scenario illustrated in FIG. 2a, is based on calls made locally wherein no toll charges apply. The originating office 30 serving the calling party in the (760) exchange, terminating office 31 serving the (780) exchange and the switching office 32 serving the (789) exchange, each make use of an updated directory number table 33 located in an internal directory number database 34, to enable the routing of an incoming call. The updated tables show that toll calls, i.e. those with an NPA prefix 35, should be routed via CIC 010 trunk 36 serving a toll or tandem exchange (not shown). Calls with the (789) prefix are routed via the CIC (789) trunk 37 to the (789) switching office 32, whereas those with a (780) prefix are routed via the CIC (780) trunk 38 to the (780) switching office 31. The updated table 33 also includes a list of station numbers 40 identified as being portable. In the example of FIG. 2a, the station having telephone number 789-2000 has been moved to a new location in the network which is normally served by a switching office 31 serving the (780) exchange. Therefore, the updated table 33 indicates that calls directed to portable numbers should launch a query to the SCP 41. A TCAP message 42 is thus formulated at the originating switch 30 and then launched wherein the area code of the called party differs from the area code of the calling party. Therefore, since the originating office 47 identifies that the dialed number is a toll call, an IAM 48 is formulated at the originating switch 47 and forwarded to NPA tandem office 50. The IAM message 48 is sent as a result of the number translation that took place at the table 49 of the originating switch 47. At the tandem office 50, the IAM message 48 is interpreted and the dialed number is identified to be associated with a portable number from a table 51, similar to the updated table 49 at the originating switch 47. A TCAP query 52 can therefore be launched from the tandem office 50 to the SCP 41, via the STP 43. At the SCP 41, a determination is made of how the call is to be routed. In this example, the response 53 to the SCP query 52 contains a new routing option indicative of a trunk to route the call to the new terminating office 31 now serving the ported called party. Once a response 53 from the SCP 41 is received, a new IAM 54 is forwarded to the new terminating office 31. In this example, the terminating office 31 serves those telephone numbers having (780) exchanges. The terminating office 31 routes the call to called station 46 and an acknowledgment message 55 is returned to the originating office 47, indicating that a conversation path 56 can be established.

Figure 3A:
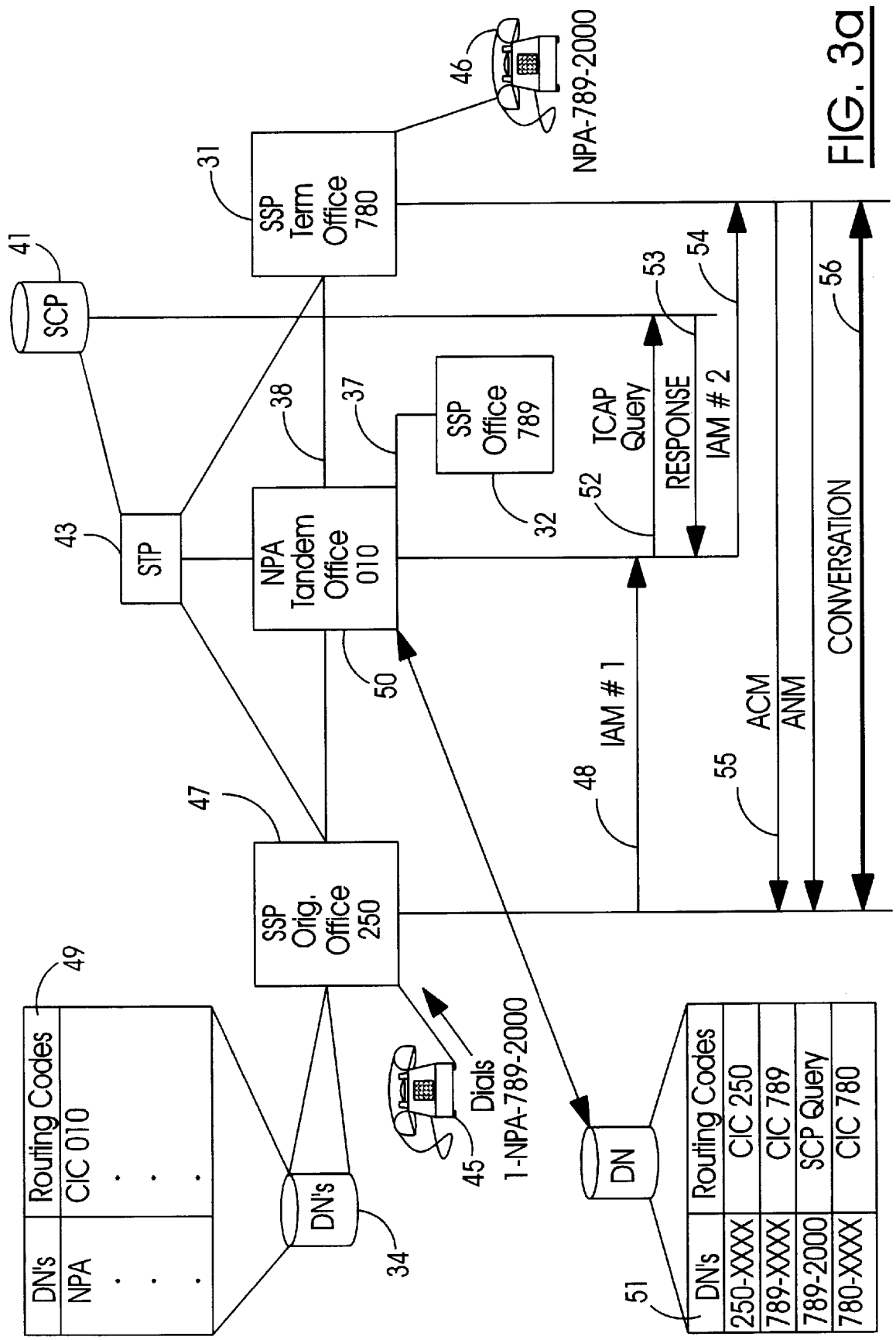
FIGS. 3a and 3b are diagrams illustrating signalling call flow scenarios according to a third and fourth embodiment of the present invention.
Figure 3B:
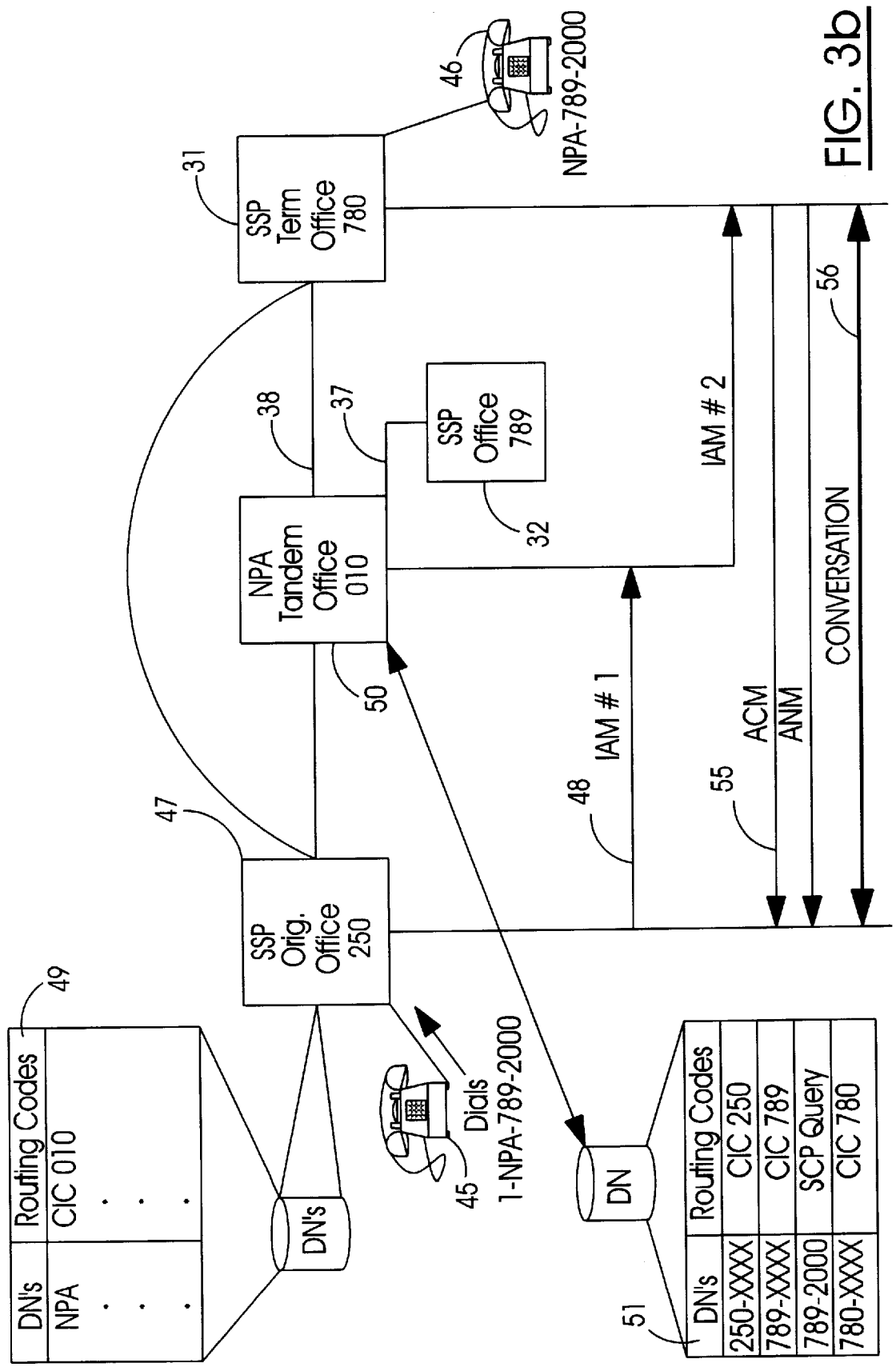

In the call scenario of FIG. 3b, a determination of how and where the call should be routed for the ported number is made at the updated table. Thus, instead of launching a query to a database for portable numbers, the updated directory table would be further enhanced with the actual routing option normally provided by the external database. For example, the routing option for the dialed number would immediately indicate that the call is to be routed to the CIC (780) trunk 38 connecting tandem office 50 to the new terminating office 31 of the called party 46.

Thus, with the method in this embodiment of the present invention, instead of forwarding a toll call via the tandem office to the switching office which would normally serve the call, if the number was not portable, the tandem office is provided with an updated table enabling it to determine at that point in the call path, whether the call is directed to a portable number and, from a database query, which switching office is now serving the called party.

As indicated above, portable numbers are anticipated to be numbers currently assigned to a specific office in the North American Numbering Plan (NANP). Where blocks of numbers are assigned to alternate service providers, they would be considered within the NANP and therefore would be routed directly based on the assigned block. Therefore, with each portable number, the terminating exchange must be updated with the information that the number is now portable. With the method of the present invention, number portability is implemented by augmenting the existing Directory Number table with a field to indicate the number is portable. This is shown in FIG. 4a. The internal database 60 at the terminating office is provided with a customer profile which includes, amongst others, a directory number field 61 and a portability field 62. This table can of course be an exclusion table, wherein the absence of the dialed DN indicates number portability. The directory number table 65 of FIG. 4b can either be used at the SCP 41 or be resident at the switching office to determine from the portable number field 66 a corresponding routing option from field 67.

The enhanced table can include a unique designation for portable numbers within the incumbent LEC network, portable numbers in a competitive local exchange carrier (CLEC) network, and numbers which have moved into another area such as an NPA. Examples of these conditions are illustrated in the table below.

Examples of Routing Options

| Dialed Number | Portable Number | by Database Query |
|---|---|---|
| 383-1234 | Yes | Trunk and Switch ID |
| 599-7325 | Yes | Carrier ID Code |
| 604-687-1234 | No | 613-788-3456 (Route Advance) |
| 613-793-6543 | Yes | 613-538-5791 (CLEC Number) |
| 705-429-3453 | Yes | 416-594-7325 (changed NPA) |

The tables need not be identical on each exchange. Thus tables can be updated uniquely and need not be duplicated or replicated across all exchanges by metropolitan area, local area, region, LATAs or any other area. This reduces the size of each table which becomes important once portable number penetration is significant. Number ranges will also be an important mechanism for reducing search time and table size.

This is illustrated with reference to the network diagram of FIG. 5. In this figure, a geographic area 650 is shown comprised of multiple regions, each of which is served by one or more switching central offices (COs). Those switching offices that share a signalling trunk, also share each others list of portable numbers. For example, the switching office 651 of region A shares a list of local portable numbers with the switching office 652 of region B, as well as the switching offices of regions G, X and Y. However, the list of portable numbers of the switching office 651 of region A is not available to the switching office 653 of region D, since those two offices do not share a common signalling trunk. Thus, if a calling party 654 in region A attempts to reach a station 655 from region D, the call path will be established via the tandem office 656. Since the tandem office 656 shares a signalling trunk with the switching office 653 of region D, it will be able to identify, from it's directory number database, that the dialed digits sent from region A are directed to a ported number now identified with region D.

Figure 5:
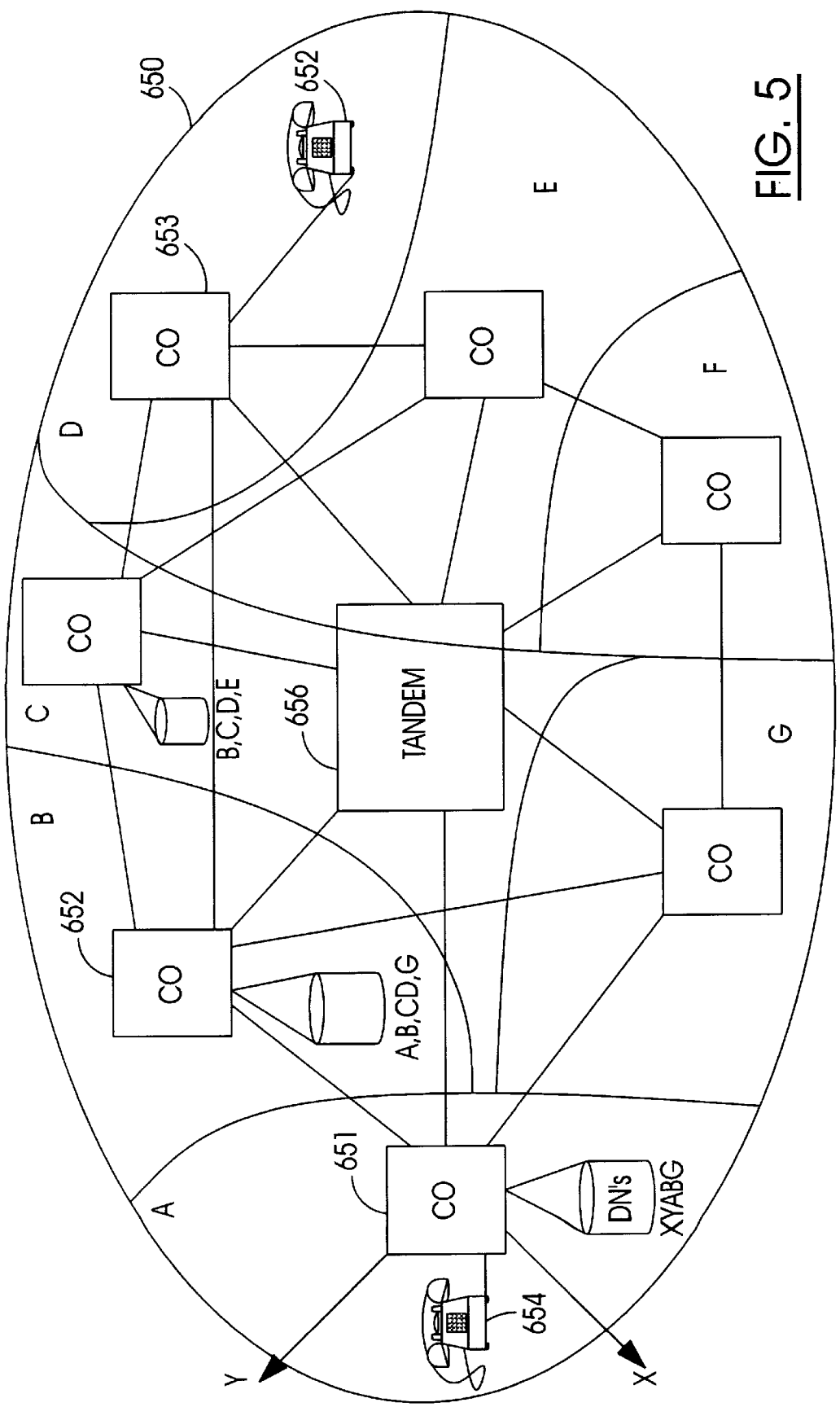
FIG. 5 is a diagram illustrating a typical network which can make use of the method of the present invention.
Figure 6:
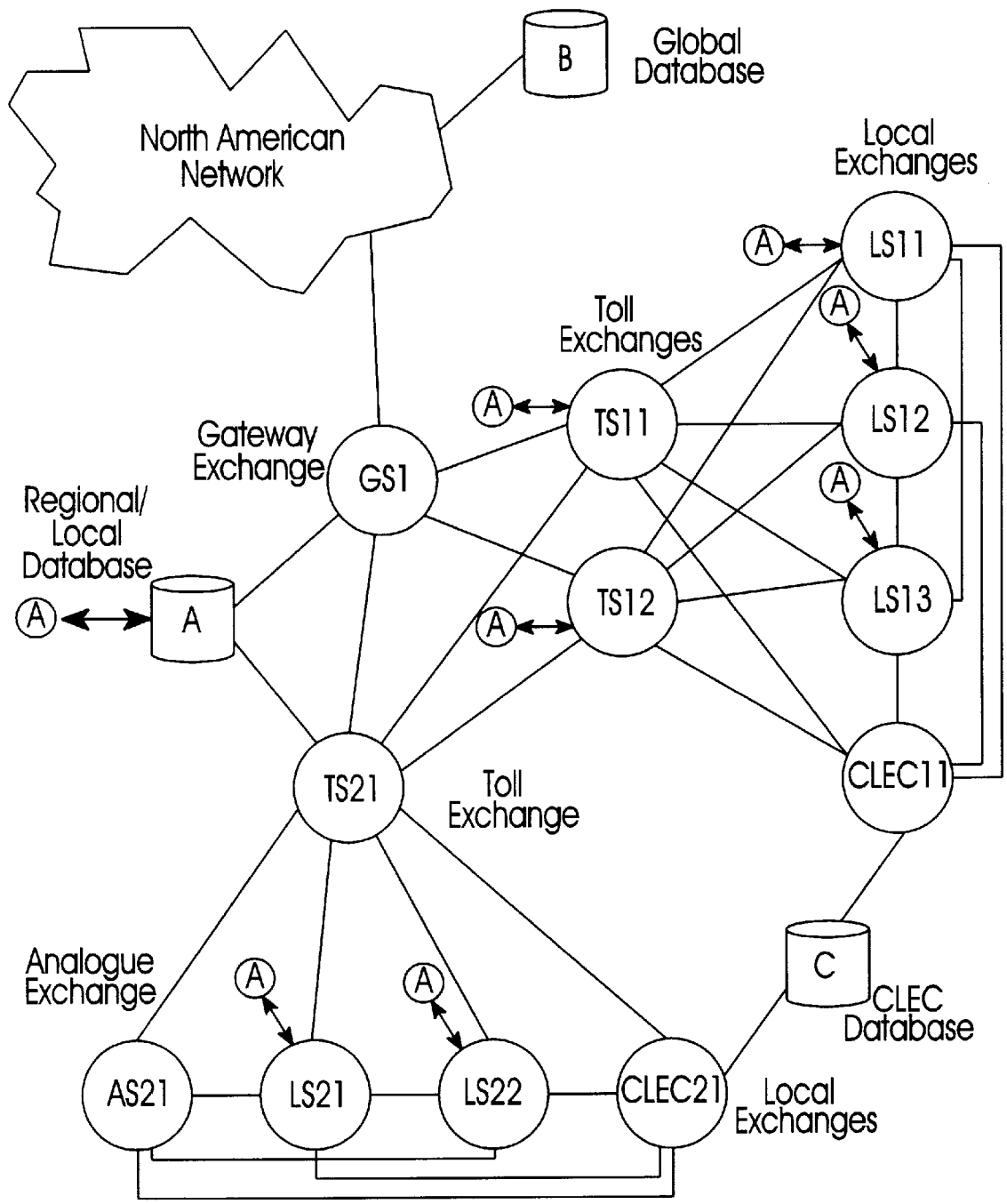
FIG. 6 is a diagram illustrating a call scenario for a network having access to a CLEC.

A call scenario making use of the network illustrated in FIG. 5, is shown in FIG. 6. In the network of FIG. 6, local exchanges LS21, LS22 and CLEC21 share a list of ported numbers, since they are connected and share at least one common signalling trunk. Similarly, local exchanges LS11, LS12, LS13 and CLEC11, also share a list of ported numbers, for the same reasons. Thus, calls made to locally ported numbers will be routed based on information obtained at a local switching office serving the called party.

However, if a calling party from say, local switching office LS21 dials a number normally associated with one of the local exchanges in group LS11, LS12, LS13 or CLEC 11, the switching office LS21 will direct the call via a toll exchange to enable the routing of the call. Once an IAM address message is received at the receiving toll exchange, a search is made at that exchange to determine whether the called number is portable. If ported, the toll exchange will either query an external database or one resident on the exchange to determine the routing option for that call. The call can then be completed as indicated before.

Figure 4B:
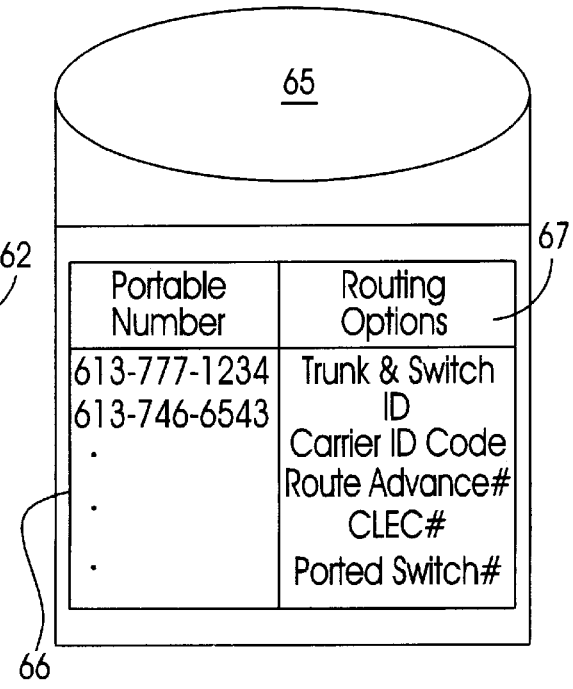

Therefore, a certain level of control over the size of the database required, can be obtained by limiting how many switching offices will be sharing a list of ported numbers. to the SCP 41, via STP 43. At the SCP, a determination is made of how and where the call should be routed for this portable number. A table, such as shown in FIG. 4b, provides the routing information. In the present example, a response 44 would be sent back from the SCP to the originating switch 30 indicating that the call is to be routed to the CIC (780) trunk 38 and not the CIC (789) trunk 37. At the originating office 30, an IAM is formulated containing the required information to establish a call path to termination office 31.

Figure 2B:
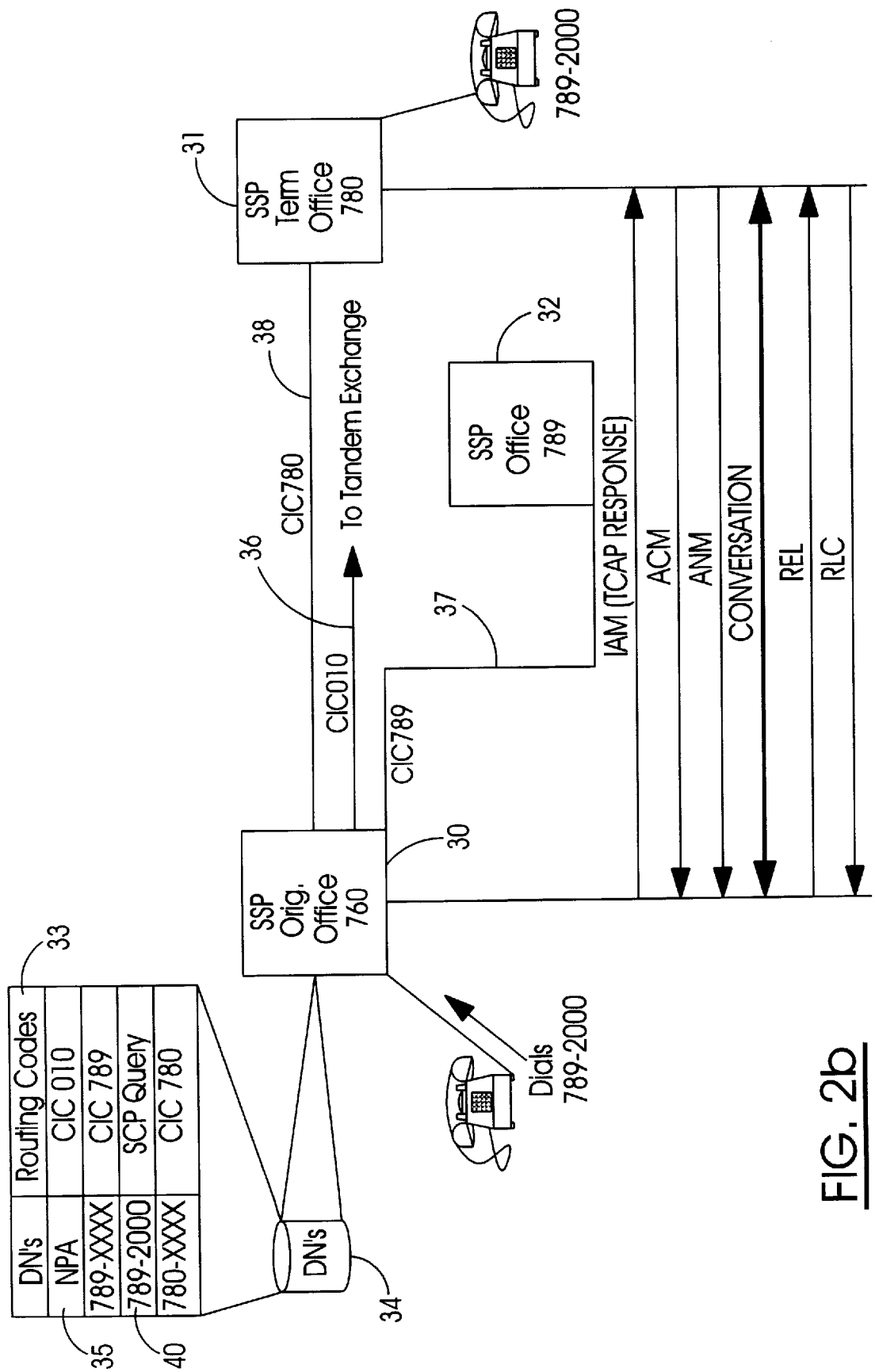

In the call scenario of FIG. 2b, a determination of how and where the call should be routed for the portable number is made at the updated table. Thus, instead of launching a query to a database for portable numbers, the updated directory table would be further enhanced with the actual routing option normally provided by the external database. For example, the routing option for the dialed number would immediately indicate that the call is to be routed to the CIC (780) trunk 38. An Initial Address Message (IAM) representative of this routing option would be created at the originating office 30 to establish a call with terminating office 31 where the called station is now ported.

In the call scenario shown in FIGS. 3a and 3b, a calling party 45 is attempting to reach a station 46 located in an area where toll charges apply. In this example, the area is situated in a different NPA, i.e.

This becomes relatively important in achieving network wide LNP, without being limited by the hardware constraints of the existing networks.

Figure 7A:
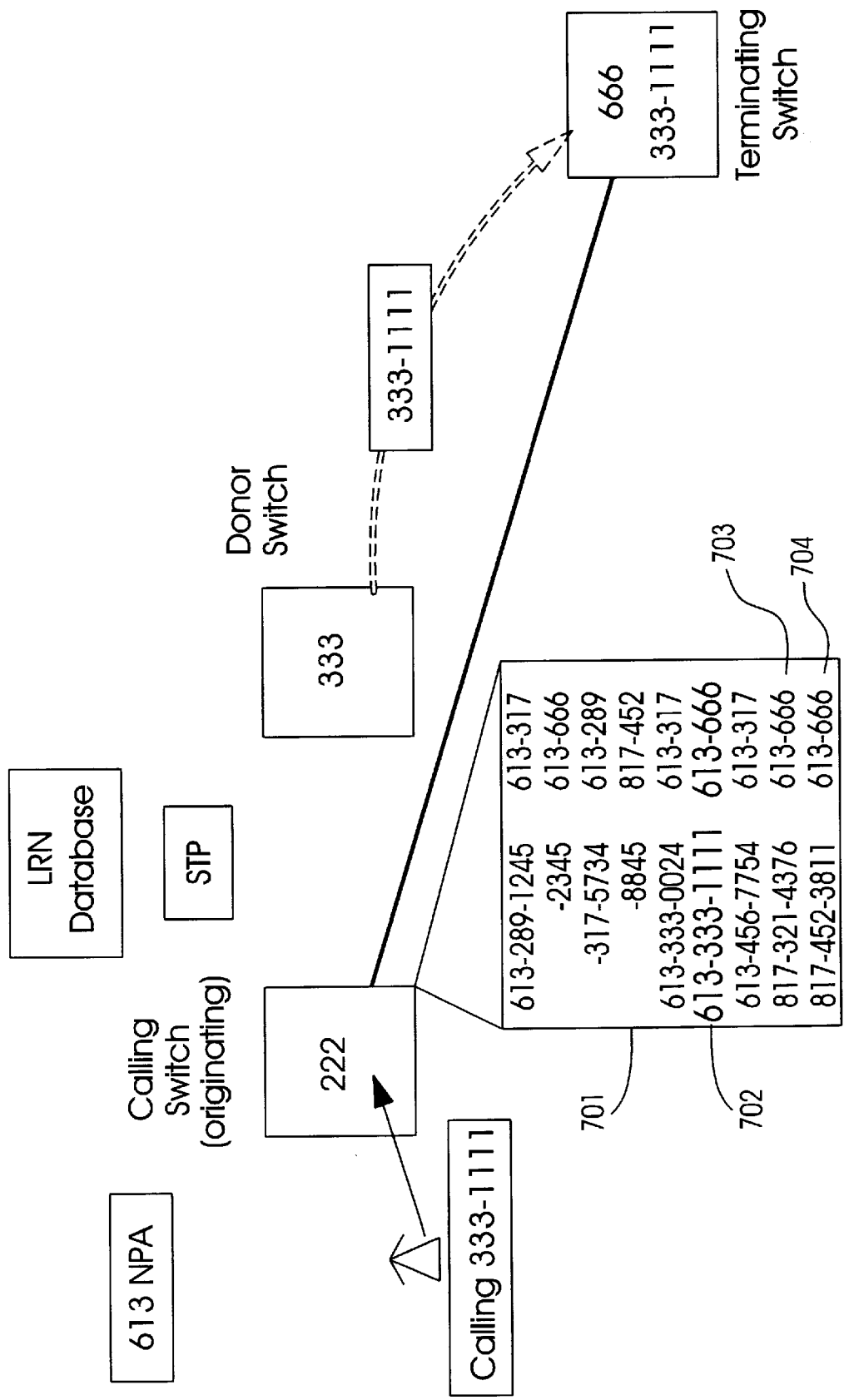

In the embodiment of the invention illustrated in FIG. 7a, the enhanced portability table has been further provided with numbers ported to terminating switches located in regions served by other area codes. Thus, not only is a query to an external database such as an SCP not required, but the routing option is available directly at the originating or serving exchange from where the call is originating or at an alternate exchange when the serving exchange cannot provide LRN service. The use of this enhanced table can be particularly advantageous as the number of portable Directory Numbers (DNs) increase in the network. This solution would eliminate potential problems associated with a large number of queries to SCPs at various locations in the network. That is, providing a routing option directly at the serving or originating switch or an alternate switch substantially improves the completion or set-up time of a call. That is because of the time required to initiate a TCAP query from the originating switch to an STP and then the SCP. The query is then verified at the SCP, a response formulated and returned to the originating switch via the STP. It is estimated that such a query can take several hundred milliseconds to complete. Overall it was found that call set-up using the enhanced routing table in this embodiment of the present invention would accomplish call set-up from three to four times faster than requesting a routing option via an external database. Evidently, as the number of queries increases, this improvement in call set-up time increases as well.

In the call scenario of FIG. 7a, the enhanced routing table 701 provides not only ported numbers for the same area code, such as shown at reference 702, but also ported numbers in other area codes such as shown at 703 and 704, wherein the subscriber is moving from a location with area code 817 to a location with area code 613. This way, the serving office would not only be able to determine which terminating switch to route the call for switches located in the same area code, but also be able to determine which toll office to route the call for calls ported to terminating offices located in a different NPA.

An example of an enhanced routing table is shown in FIG. 7b for numbers ported to switches in the same area code, i.e. area code 613. If the subscriber is changing service provider, the table is further provided with a service provider ID 706 to enable the network to identify the subscriber's choice of service provider. The merging of the two tables identified in FIG. 4a and 4b will result in faster, more efficient data lookup.

The content of the tables are, however, not limited to the items identified. They have the flexibility to grow to accommodate additional items normally provided via a TCAP query to an SCP. In addition, since the data entries are related to individual customers (business or residential), use of these tables and the associated data is not limited to LNP applications.

Figure 8:
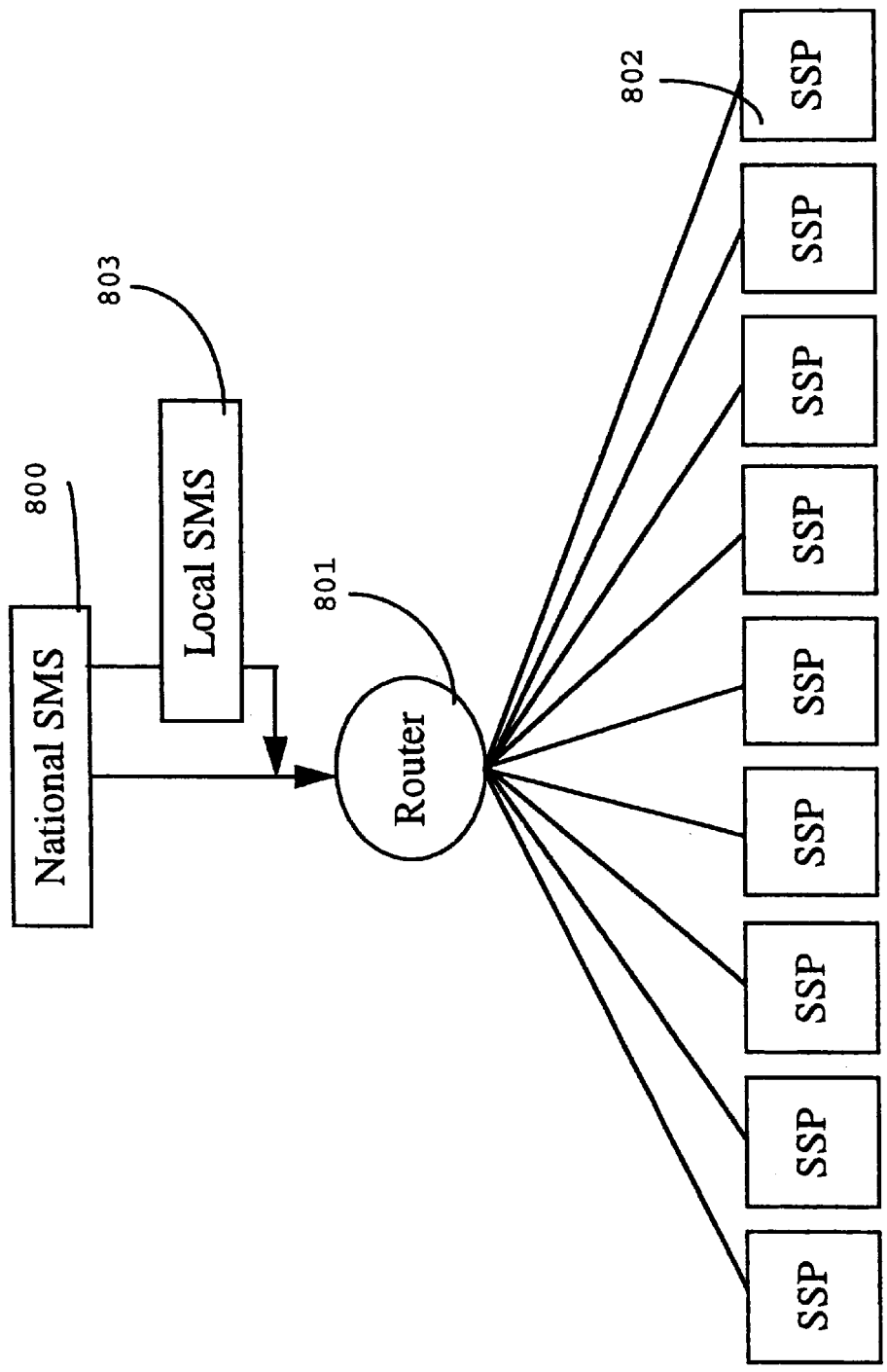
FIGS. 8 is a block diagram illustrating how the enhanced portability tables are updated.

Depending on the size of network, the enhanced routing tables can be updated directly at each switch as illustrated in FIG. 8 from a national Services Management System 800 via a data router 801 or from a local Services anagement System. Depending on the level of activity in the network, the national SMS database would be downloaded via router 801 to update each SSP with the enhanced routing tables 802. In instances where the network is relatively large, the updates to individual SSPs could be done from the national SMS via local or regional SMS 803. Ideally, only network change information would be provided, however complete copies of the data could also be transmitted. The updates could be done at frequent intervals on a daily basis or continuously as the need arises. Data filtering by router or SMS could be employed to limit the amount of data each switch receives, making the data unique to its portability area.

Figure 9:
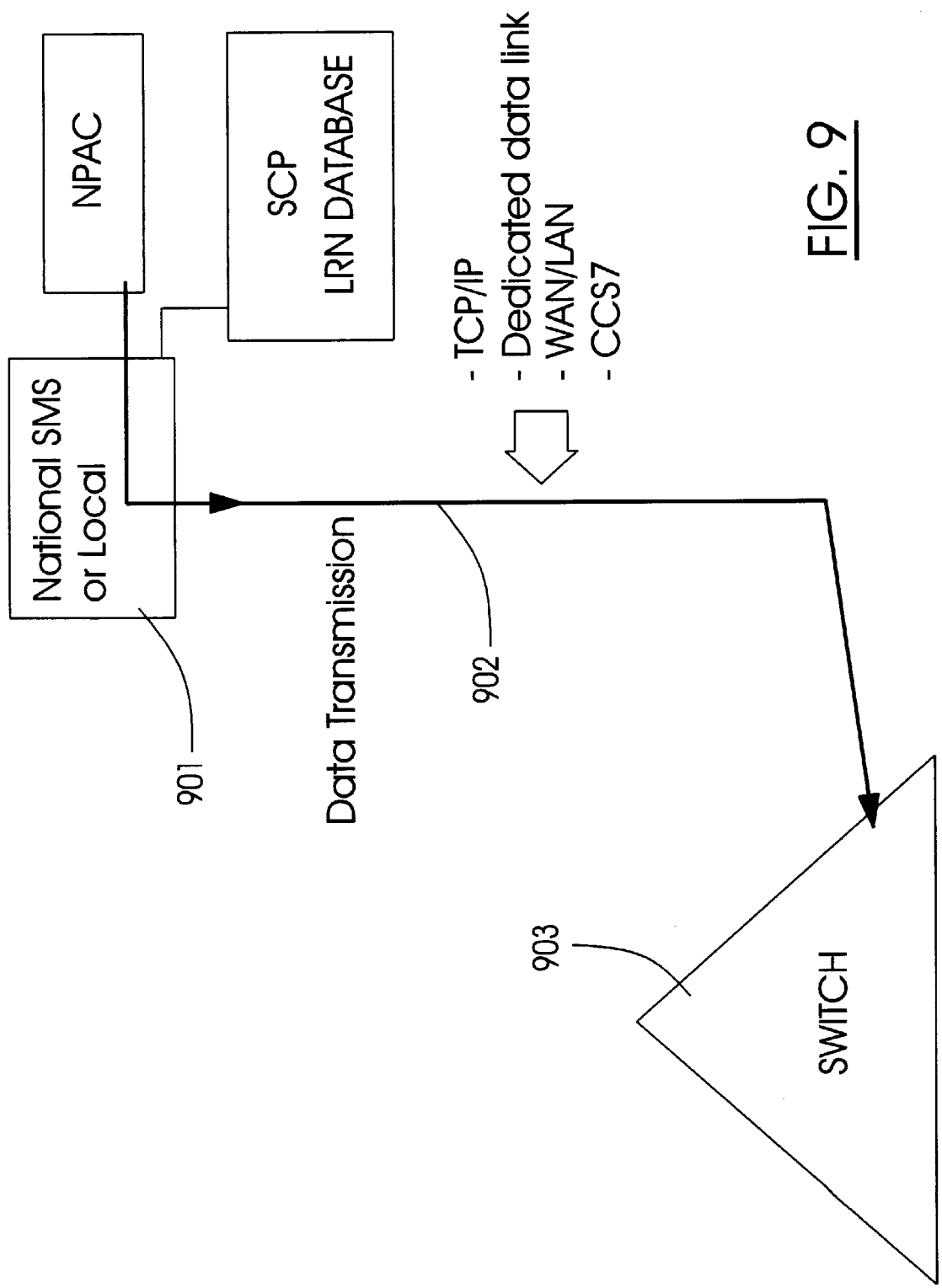
FIG. 9 is a block diagram of a platform used to update the enhanced portability table of the present invention.

In the scenario of FIG. 9, the new routing information is updated directly from the national or local SMS to individual SSPs. Several data networking options 902 can be used. These include, but are not limited to TCP/IP, dedicated data links, WAN/LAN and CCS7 networks. A data gathering command is initiated by the switch 903 or by the SMS 901.

In view of the amount of information that would be required in the enhanced routing tables at each switch, increased memory capacity would have to be provided.

Figure 10:
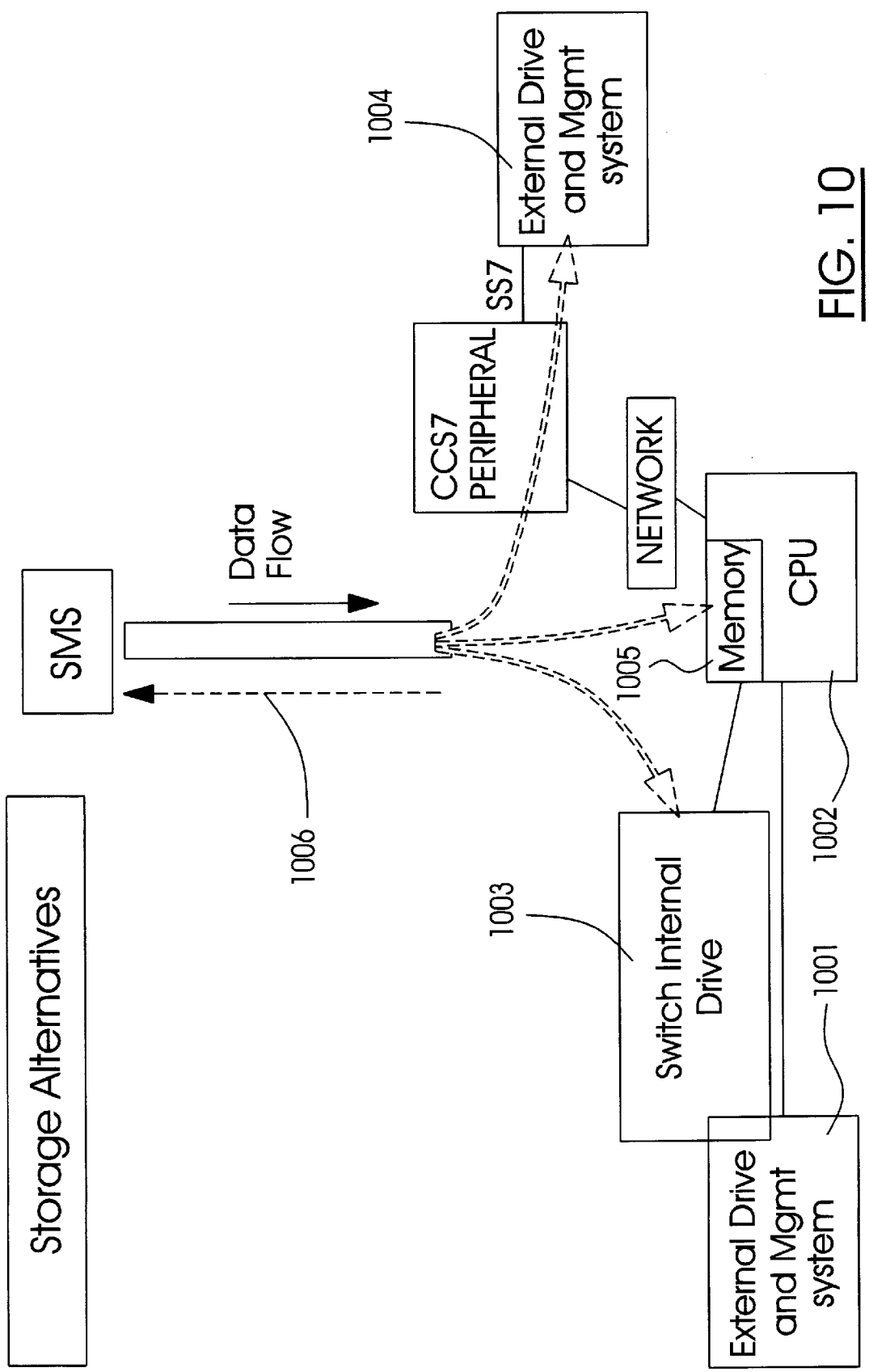
FIG. 10 is a block diagram illustrating various storage alternatives for the enhanced portability table.

As shown in FIG. 10, the extra memory capacity can be provided via an external drive 1001 connected via a suitable bus to the central processor of the switch 1002. Similarly, the switch internal drive 1003 could be upgraded to increase its memory capacity to enable storage of the newly downloaded information. If CCS7 networking were to be used, an external storage drive 1004 could be connected through an SS7 peripheral device. In conjunction with the drive storage options, or on a stand along basis, data can be stored within the central processor on memory cards. This would speed up data access. Backup copies could be stored on associated disk drives 1001, 1003 or 1004.

Data management software is used to manage the data update process. A direct memory access procedure can also be used to enable data to be sent directly to the central processor memory. A scheduling function resides within the switch to control and perform memory updates. In necessary, a feedback loop to the SMS could also be provided to permit the SMS to view the data content on the switch.

Initially, the switch will receive an initial copy of a complete set of data relevant to such conditions as the particular portability serving area from the national SMS or the SCP database. Once this data has been provided, only updates containing the relevant information will be automatically sent from the SMS over the data transfer network to the switch's database table. The database is provided with sufficient flexibility to store and receive additional update information associated with LNP such as service provider ID, etc. In addition, the resident information can be used to support new or modified non-LNP services and capabilities that can utilize the information resident in this switch-located database.

This solution therefore provides better use of the network's resources and at the same time, reduces the costs associated with providing number portability.

It should be noted that the data contained in the enhanced data tables could also contain other information currently provided by an external SCP. For example, calls made using the toll free 800 or 888 prefix could be routed from the originating switch without the need for a TCAP query to an external SCP. Currently, calls making use of the toll free 800 or 888 prefix trigger a TCAP query to an SCP. With the method of the present invention, the routing option could be provided at the serving exchange or an alternate exchange along the signalling path if the serving exchange cannot serve the call.

Similarly, calls directed to telephone pager numbers trigger a query to an external SCP to determine how to route the call. All these numbers could be updated at each telephone exchange with the system and method of the present invention.

Variations of the particular embodiment herewith described will be obvious to one skilled in the art, and accordingly the embodiment is to be taken as illustrative rather than limitive, the true scope of the invention being set out in the appended claims.

What we claim is:

1. In a telephone network having a number of telephone switching offices equipped with SSPs (Service Switching Points), a method of providing number portability for the treatment of calls from a calling party to a ported number of a called party, comprising the steps of:

a) receiving digits dialed by said calling party at a switching office serving said calling party;

b) determining from a first directory number database collocated at a first exchange, whether the dialed digits are associated with a ported number;

c) querying a second directory number database to obtain routing information, if the dialed digits are determined at step b) to be associated with a ported number;

d) establishing a signalling path from said first exchange to a terminating exchange associated with the ported number by creating an Initial Address Message (IAM) according to said routing information; and e) receiving said Initial Address Message (IAM) at said terminating exchange to enable the call to reach the called party.

2. A method as defined in claim 1, wherein said first and second directory databases are combined into a single database collocated at said first exchange.

3. A method as defined in claim 1, wherein said first and second directory databases are updated with new routing information downloaded from a network Services Management System (SMS).

4. A method as defined in claim 3, wherein said new routing information are downloaded directly to each switching office.

5. A method as defined in claim 4, wherein said new routing information are downloaded from an Service Management System (SMS) environment to said switching offices.

6. A method as defined in claim 5, wherein said new routing information is downloaded to said switching offices' internal disk storage device.

7. A method as defined in claim 5, wherein said new routing information is downloaded to an external storage and management device collocated with said switching offices.

8. A method as defined in claim 5, wherein said new routing information is downloaded to said switching offices via an CCS7 link.

9. A method as defined in claim 5, wherein said new routing information is downloaded to said switching offices via a dedicated data link.

10. A method as defined in claim 5, wherein said new routing information is downloaded to said switching offices via a Wide Area Network/Local Area Network (WAN/LAN).

11. A method as defined in claim 7, wherein said new routing information is downloaded to said switching offices via an Ethernet link.

12. A method as defined in claim 2, wherein said database is provided by a central processor memory card at said switching offices.

13. In a telephone network having a number of telephone switching offices equipped with SSPs (Service Switching Points), a system for providing number portability for the treatment of calls from a calling party to a ported number of a called party, comprising:

a) a first switching office for receiving digits dialed by said calling party;

b) an alternate switching office connected to said first switching office via a signalling path established for routing a call associated with the dialed digits;

c) first directory number database for determining whether said dialed digits are associated with a portable number collocated with said alternate switching office; and d) a second directory number database containing new routing information, for said dialed digits determined to be associated with a portable number and translating said dialed digits to provide new routing information, such that when an Initial Address Message (IAM) containing new routing information is received at a terminating office said terminating office can enable said call to reach said called party.

14. A system as defined in claim 13, wherein said first and second directory databases are combined into a single database collocated with said alternate switching office.

15. A system as defined in claim 13, wherein said first and second directory databases are updated with new routing options downloaded from a network Services Management System (SMS).

16. A system as defined in claim 15, wherein said new routing information is downloaded directly to each alternate switching office.

17. A system as defined in claim 15, wherein said new routing information is downloaded from an Service Management System (SMS) environment to said alternate switching offices.

18. A system as defined in claim 17, wherein said new routing information is downloaded to said alternate switching offices' internal disk storage device.

19. A system as defined in claim 17, wherein said new routing information is downloaded to an external storage and management device collocated with said alternate switching offices.

20. A system as defined in claim 17, wherein said new routing information is downloaded to said alternate switching offices via an CCS7 link.

21. A system as defined in claim 17, wherein said new routing information is downloaded to said alternate switching offices via a dedicated data link.

22. A system as defined in claim 17, wherein said new routing information is downloaded to said alternate switching offices via a Wide Area Network/Local Area Network (WAN/LAN).

23. A system as defined in claim 17, wherein said new routing information is downloaded to said alternate switching offices via an Ethernet link.

24. A system as defined in claim 14, wherein said database is provided by a central processor memory card at said alternate switching offices.

* * * * *